US008775626B2

(12) United States Patent
Teather et al.

(10) Patent No.: US 8,775,626 B2
(45) Date of Patent: Jul. 8, 2014

(54) USING TEMPLATES TO CONFIGURE CLOUD RESOURCES

(75) Inventors: Gregory Wray Teather, Redmond, WA (US); Parmita Mehta, Kirkland, WA (US); Salim Alam, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 12/965,550

(22) Filed: Dec. 10, 2010

(65) Prior Publication Data

US 2012/0072597 A1 Mar. 22, 2012

Related U.S. Application Data

(60) Provisional application No. 61/383,924, filed on Sep. 17, 2010.

(51) Int. Cl.
*G06F 15/16* (2006.01)

(52) U.S. Cl.
USPC .......................................... 709/226

(58) Field of Classification Search
USPC ........................................ 709/221, 226, 229
See application file for complete search history.

(56) References Cited

U.S. PATENT DOCUMENTS

| 7,496,890 | B2 | 2/2009 | Miller |
| 7,725,572 | B1 | 5/2010 | Kautzleben |
| 2005/0021688 | A1 | 1/2005 | Felts |
| 2006/0026267 | A1 | 2/2006 | Godin |
| 2007/0162892 | A1 | 7/2007 | Zenz |
| 2008/0163194 | A1 | 7/2008 | Dias |
| 2009/0276771 | A1 * | 11/2009 | Nickolov et al. ............. 717/177 |
| 2010/0058332 | A1 * | 3/2010 | Dehaan ........................ 717/177 |
| 2010/0199276 | A1 * | 8/2010 | Umbehocker .................... 718/1 |
| 2010/0223610 | A1 * | 9/2010 | Dehaan et al. ................ 717/178 |
| 2011/0022812 | A1 * | 1/2011 | van der Linden et al. .... 711/163 |
| 2013/0346899 | A1 * | 12/2013 | Cole et al. ...................... 715/771 |

OTHER PUBLICATIONS

Microsoft TechNet, "What's New in Windows HPC Server 2008 R2", Jul. 23, 2010, 6 pages.
Clustervision, "Windows HPC Server 2008", Based on information and belief available, at least as early as Oct. 4, 2010, 6 pages.
Trader, Tiffany, "Latest Windows HPC Server Hits Wall Street", Sep. 21, 2010, 10 pages.

* cited by examiner

*Primary Examiner* — Joseph E Avellino
*Assistant Examiner* — Deforrest Bailey
(74) *Attorney, Agent, or Firm* — Nicholas Chen; David Andrews; Micky Minhas

(57) ABSTRACT

The present invention extends to methods, systems, and computer program products for using templates to configure cloud resources. Embodiments of the invention include encapsulating cloud configuration information in an importable/exportable node template. Node templates can also be used to bind groups of nodes to different cloud subscriptions and cloud service accounts. Accordingly, managing the configuration of cloud based resources can be facilitated through an interface at a (e.g., high performance) computing component. Templates can also specify a schedule for starting/stopping instance running within a resource cloud.

10 Claims, 3 Drawing Sheets

USING TEMPLATES TO CONFIGURE CLOUD RESOURCES

CROSS-REFERENCE TO RELATED APPLICATIONS

This application claims the benefit of U.S. Provisional Patent Application No. 61/383,924, entitled "Simplified Cloud Resource Configuration Using Templates", filed Sep. 17, 2010, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premise" within the infrastructure. In other environments, one entity uses another entity's infrastructure to run application on behalf of the entity. For example, one entity can run an application on machines in another entity's data center. Running an application in another entity's data center can be referred to as running an application "in the cloud".

When applications are run in the cloud, computing resources and storage resources of the data center are allocated to a user. Data centers providing cloud based resources typically require an account so that the owner of the cloud resource can bill for resource usage. As such, one desiring to use cloud based resources can establish an account for that purpose. Once an account is established, setting up a system within the cloud typically includes configuring two components, a service (computing resources) and data (storage resources).

Configuration of service and data in the cloud is typically a manual process, prone to human errors. Further manual data entry (e.g., of credentials) can also be required to subsequently access computing and storage resources in the cloud. That is, a user is typically required to submit appropriate credentials along with resource access requests. For example, a user may be required to manually submit an appropriate key to access allocated storage resources. Manual data entry can lead to errors preventing access to cloud resources.

Some hybrid environments include using on premise resources and cloud resources. In these environments, a user may configure on premise resources though an established interface using known data formats. However, the interface and data formats may not be usable to configure cloud resources. As such, a user reverts to manually entering data through a separate interface to configure cloud based resources.

BRIEF SUMMARY

The present invention extends to methods, systems, and computer program products for using templates to configure cloud resources. Account data for a customer that is to use resources in the resource cloud is accessed. A cloud node template is populated with the accessed account data. User commands for deploying resources in the resource cloud are received.

The cloud node template is used to access relevant account data for the customer. A deployment for use in the resource cloud is formulated. The deployment represents the user commands in accordance with the relevant account data for the customer. The deployment is submitted to a cloud management service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
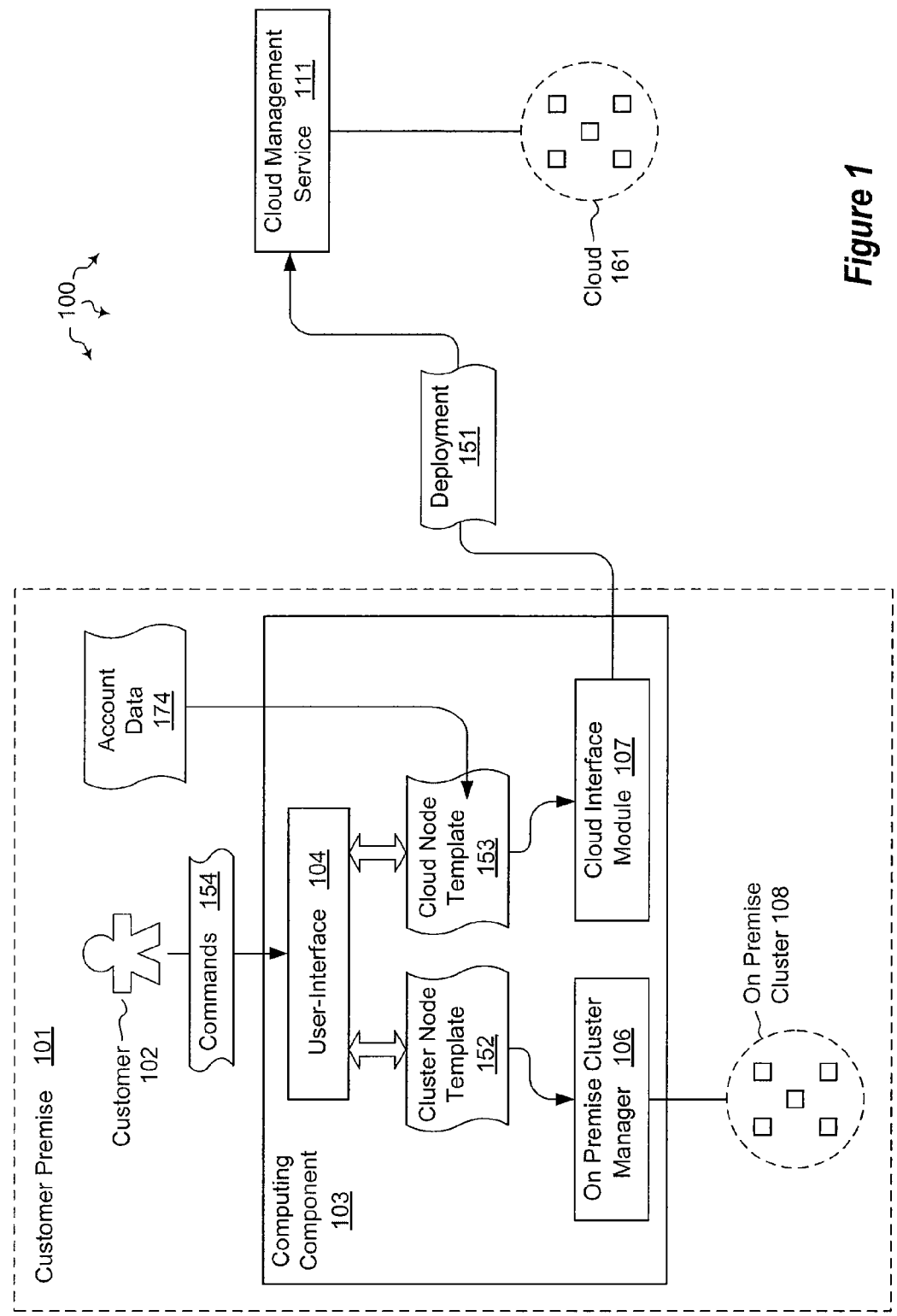
FIG. 1 illustrates an example computer architecture that facilitates using templates to configure cloud resources.

The present invention extends to methods, systems, and computer program products for using templates to configure cloud resources. Account data for a customer that is to use resources in the resource cloud is accessed. A cloud node template is populated with the accessed account data. User commands for deploying resources in the resource cloud are received.

The cloud node template is used to access relevant account data for the customer. A deployment for use in the resource cloud is formulated. The deployment represents the user commands in accordance with the relevant account data for the customer. The deployment is submitted to a cloud management service.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include using templates within a (e.g., high performance) computing component to encapsulate a common configuration for a set of nodes in a resource cloud. Using templates for cloud-based resources provides mechanisms to store cloud configuration information in a centralized location. Using templates for cloud-based resources also provides for automating the deployment of (e.g., high performance) computing worker nodes in a resource cloud. Templates also provide import/export functionality for cloud configuration information.

Thus embodiments of the invention include encapsulating cloud configuration information in an importable/exportable node template. Templates can also be used to bind groups of nodes to different cloud subscriptions and cloud service accounts. Accordingly, managing the configuration of cloud based resources can be performed through an interface at a (e.g., high performance) computing component. Templates can also specify a schedule for starting/stopping instance running within the cloud.

FIG. 1 illustrates an example computer architecture 100 that facilitates simplified cloud resource configuration using templates. Referring to FIG. 1, computer architecture 100 includes customer premise 101, cloud management service 111, and cloud 161. Customer premise 101 further includes computing component 103 and on premise cluster 108. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computing component 103 further includes on premise cluster manager 106 and cloud interface module 107. On premise cluster manager 106 is configured to submit work for execution using resources in on premise cluster 108. Customer 102 can enter commands 154 through user-interface 104, which are used to configure and control the use of on premise cluster 108.

User-interface 104 also provides a unified user-interface experience for modifying cluster node templates and cloud node templates. For example, commands 154 can be entered to edit cluster node template 152 or cloud node template 153.

Cluster node template 152 can encapsulate a common configuration for a set of nodes in on premise cluster 108. Commands 154 can edit cluster node template 152 to configure a set of nodes in on premise cluster 108 for a specific purpose. On premise cluster manager 106 can then use data in cluster node template 152 to configure and control the use of on premise cluster 108.

On premise cluster 108 can include a cluster of computer systems configured to interoperate with one another and aggregate resources together (e.g., processor, storage, and system memory) to solve (e.g., different portions of larger and/or more complex) computations that would overburden a single computer system. The cluster of computer systems can include a plurality of computer systems, such as, for example, tens or even hundreds of computer systems, having computational and storage resources.

From time to time, customer 102 may also desire to use computation and storage resources in cloud 161 (e.g., to supplement the use of on premise cluster 108). To establish a relationship between customer premise 101 and cloud 161, customer 102 can register for a subscription with cloud manager service 111. In response, cloud management service 111 can return account data 174 to customer 102. Cloud management service 111 can also store account data 174 along other credentials, for example, a storage credential (e.g., a storage encryption key) in an account database.

Customer 102 can also provide account data 174 to computing component 103 through the user-interface 104. Computing component 103 can store account data 174. Computing component 103 can subsequently use account data 174 on behalf of customer 102 to facilitate the performance of work in cloud 161.

To facilitate the performance of work in cloud 161, customer 102 can enter commands 154 through user-interface 104, which are used to configure and control the use of resources in cloud 161. Cloud node template 153 can encapsulate a common configuration for a set of nodes in cloud 161. Commands 154 can edit cloud node template 153 to configure a set of nodes in cloud 161 for a specific purpose. Cloud interface module 107 can then use data in cloud node template 152 to configure and control the use (deployment 151) of resources in cloud 161.

Figure 2:
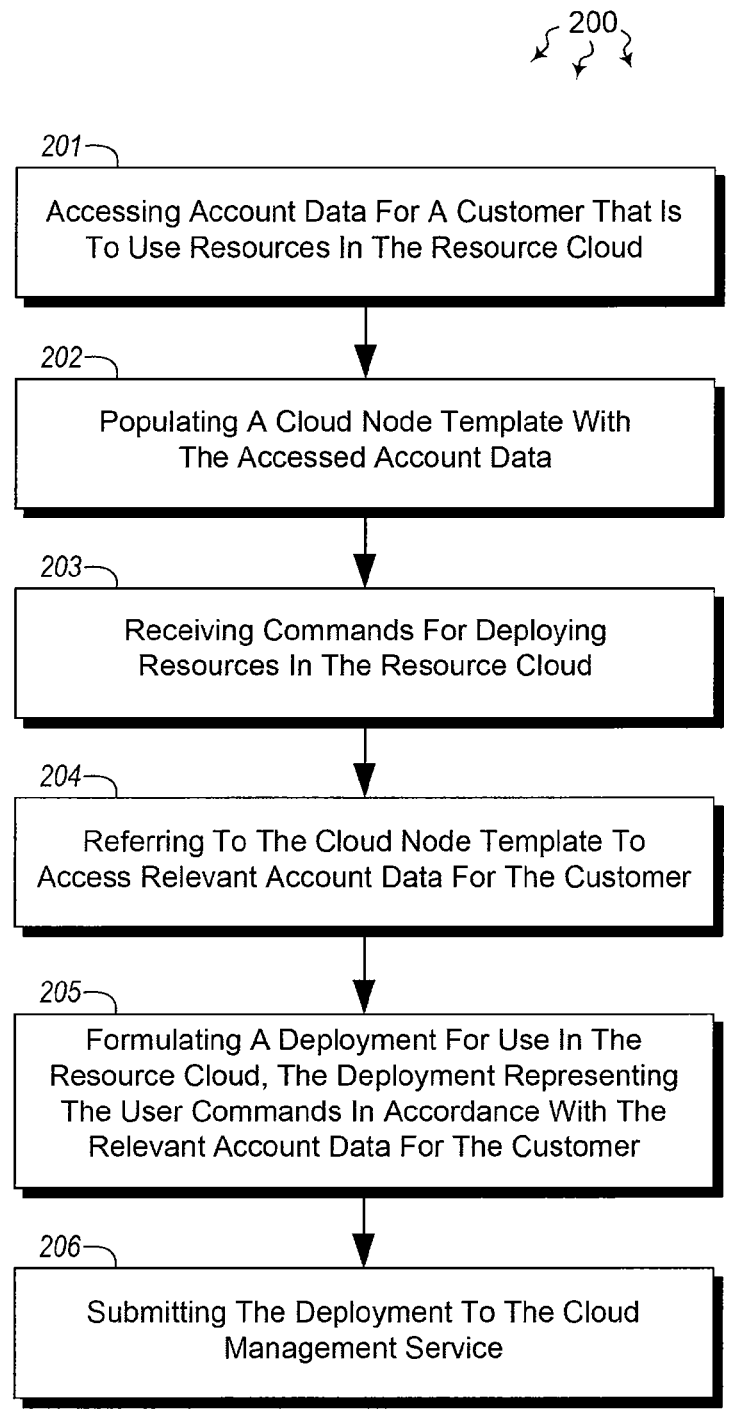
FIG. 2 illustrates a flow chart of an example method for using templates to configure cloud resources.

FIG. 2 illustrates a flow chart of an example method 200 for using templates to configure cloud resources. Method 200 will be described with respect to the components and data in computer architecture 100.

Method 200 includes an act of accessing account data for a customer that is to use resources in the resource cloud (act 201). For example, computing component 103 can access account data 174 for customer 102. Computing component 103 can access account data 174 in an automated manner and/or user 102 can enter account information 174 through user-interface 104. Method 200 includes an act of populating a cloud node template with the accessed account data (act 202). For example, computing component 103 can populate cloud node template 153 with account data 174. Subsequently, cloud node template 153 can be stored at computing component 103 so that information for deploying nodes in cloud 161 is maintained in a central location.

Method 200 includes an act of receiving user commands for deploying resources in the resource cloud (act 203). For example, user-interface 104 can receive commands 154 from customer 102. Commands 102 can be commands for deploying resources in cloud 161. Method 200 includes an act of referring to the cloud node template to access relevant account data for the customer (act 204). For example, cloud interface module 107 can refer to cloud node template 153 to access relevant portions of account data 174 for user 102.

Method 200 includes an act of formulating a deployment for use in the resource cloud, the deployment representing the user commands in accordance with the relevant account data for the customer (act 205). For example, cloud interface module can formulate deployment 151 for use in cloud 161. Deployment 151 represents user commands 154 in accordance with relevant portions of account data 174. Method 200 includes an act of submitting the deployment to the cloud management service (act 206). For example, cloud interface module 107 can submit deployment 151 to cloud management server 111. Cloud management service 111 can allocate resources of cloud 161 for use by customer 102.

Deployment 151 can include operational data along with appropriate credentials for storage within cloud 161. Operational data can include data for configuring resources of cloud 161 to assist in computations that are also being worked on by resources in on premise cluster 108. Deployment 151 can also include binary code along with credentials for storage within cloud 161. Subsequently, the binary code can be executed within cloud 161 to instantiate computing services. Services can receive and process units of work to assist resources within on premise cluster 108.

Thus, the submission of operational data and binary code is collectively represented as deployment 151. Upon receiving deployment 151, cloud management service 111 performs a number of operations to implement deployment 151, such as, for example, successfully appending cloud resources to a cluster for use by computing component 103.

In some embodiments, computing component 103 is a High Performance Computing ("HPC") component (e.g., a head node for on premise cluster 108). As such, work submitted for execution (to on premise cluster 108 and/or to cloud 161) can be part of scientific or other computationally intensive operations. In these embodiments, operational data can be HPC operational data and binary code can be HPC binary code. Based on HPC operational data and HPC binary code, HPC service 137 can run within cloud 161. The HPC service can include queues for accepting units of HPC work, mapping tables to track machines, etc.

In some embodiments, cluster node templates and cloud node templates are formatted in accordance with a node template schema. Generally, a node template can include a number of child template items, encapsulating pieces of configuration. For example, HPC Node Templates for a cloud can contain a template Item "DeployCloudWorker". A DeployCloudWorker item can contain configuration information used for deploying HPC instances in the cloud. Configuration information can include, for example: 1) The ID of the Cloud Subscription; 2) certificate information for contacting cloud management services; 3) The cloud service name to use; 4) The cloud storage service name to use. Additionally, there is an optional second template item "DeploymentSchedule", which can be used to provide a schedule for when cloud instances should be started and stopped.

Figure 3:
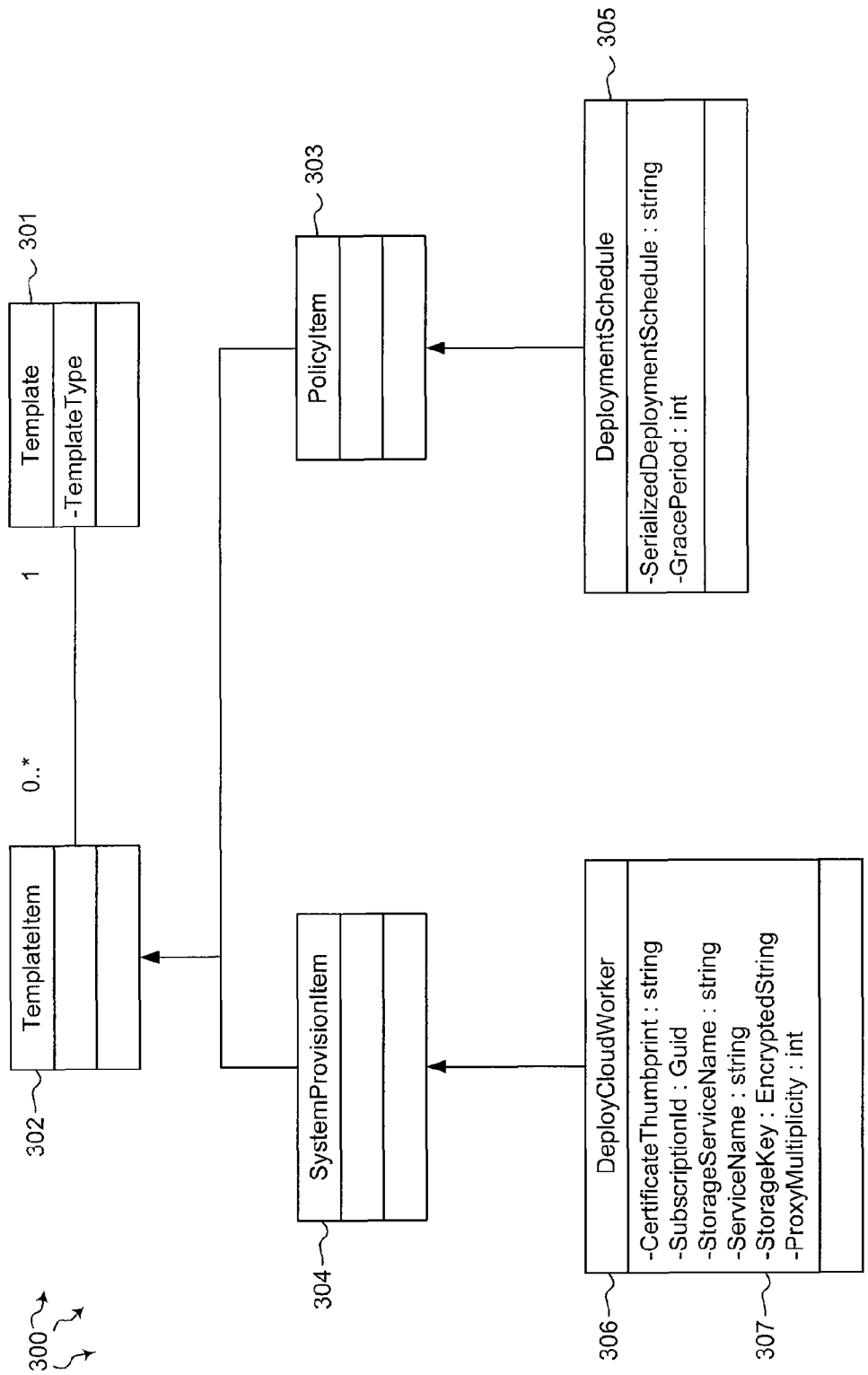
FIG. 3 illustrates an example node template schema.

FIG. 3 depicts a portion of an example node template schema 300. As depicted, template 301 includes zero or more TemplateItems 302. Each TemplateItem 302 includes a SystemProvisionItem 304 and a PolicyItem 303. SystemProvisionItem 304 can include a DeployCloudWorker 306. PolicyItem 303 can include a DeploymentSchedule 305. Data in cloud node template 153 can be represented in a format similar to that defined in node template schema 300. For example, computing component 103 can use StorageKey 307 to access storage resources in cloud 161 on behalf of customer 102. However, any variety of different SystemProvisionItems and PolicyItems can be included in template schema 300 and/or in cloud node template 153.

When cloud resources are added to a cluster, they can be bound to a specific template for their lifetime. The template is used to bind the set of cloud resources to a specific cloud subscription and service name. The template is persisted to a database, and is subsequently used to drive cloud-specific operations, such as: starting a set of cloud workers, stopping a set of cloud workers, and reading cloud worker performance data.

Additionally, an optional deployment schedule can start or stop cloud workers without user intervention. A deployment schedule can also be used to control availability of on-premise workstations or to stop/start any type of on-premise resource. When a deployment schedule is used, deployment commands can be automatically submitted to computing component 103 (e.g., from a scheduler module). Thus, a user (e.g., user 102) can set up a schedule and is relieved from having to enter commands manually.

Accordingly, embodiments of the invention facilitate providing an administrator/operator of a cluster with familiar interface and interaction with the administrative software (e.g. that of computing component 103, including user-interface 104), with extensions for cloud resources that change the cluster characteristics (e.g., local storage or server size as small, medium, etc.)

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for configuring cloud resources at a computing component of a customer premise, the method comprising:
    storing a cluster node template which includes a schema that is used by a customer at a computing component of a customer premise to encapsulate a common configuration for a of set nodes that represent resources provided at an on-premise cluster of nodes;
    storing a cloud node template which includes a schema that is used by a customer at a computing component of a customer premise to encapsulate a common configuration for a set of nodes that represent cloud resources;
    accessing account data established by the customer that permit the customer's use of cloud resources;
    entering the customer's account data at a user interface of the computing component at the customer premise; one or more processors at the computing component retrieving the cloud node template and populating the schema of the cloud node template with the accessed account data; entering a first set of commands at the user interface that result in establishing a common configuration for a set of nodes that represent particular cloud resources to be employed at the cloud on behalf of the customer;
    entering a second set of commands at the user interface that result in establishing a common configuration for a set of nodes that represent particular cloud resources to be employed at the cloud on behalf of the customer, and which supplement the resources otherwise provided by the set of nodes of the on-premise cluster;
    one or more processors at the computing component populating the schema of the cluster node template with the common configuration for the set of nodes representing the particular resources of the on-premise cluster, and the one or more processors at the computing component also populating the schema of the cloud node template with the common configuration for the set of nodes representing the particular cloud resources to be employed at the cloud on behalf of the customer;
    instantiating at the computing component a cloud interface module which formulates commands for deploying resources in the cloud in accordance with the common configuration of the cloud node template for the account data contained in the cloud node template;
    instantiating at the computing component an on-premise cluster manager which formulates commands for deploying resources in the on-premises cluster in accordance with the common configuration of the cluster node template;
    the on-premise cluster manager submitting the formulated commands for deploying resources in the on-premise cluster in accordance with the common configuration of the cluster node template;
    the cloud interface module submitting the formulated commands for deploying resources in the cloud in accordance with the common configuration of the cloud node template for the account data contained in the cloud node template to a cloud management service which thereafter employs cloud resources as specified in the common configuration on behalf of the account identified by the account data in the cloud node template;
    storing both the populated cluster node template and the populated cloud node template so that each stored node template can be imported or exported for subsequent use in providing the common configuration contained therein to facilitate deployment of resources when desired by the customer.

2. The method as recited in claim 1, further comprising storing the cloud node template subsequent to populating the cloud node template with the access account data so that information for deploying nodes in the cloud is maintained in a central location.

3. The method as recited in claim 1, wherein entering one or more commands at the user interface that result in establishing a common configuration for a set of nodes that represent particular cloud resources to be employed at the cloud comprises including a deployment schedule for the commands.

4. The method as recited in claim 1, wherein the commands for deploying resources in the cloud comprise commands for deploying a high performance computing service in the cloud.

5. The method as recited in claim 1, wherein accessing account data comprises accessing one or more of: a subscription ID, a service account name, a storage account name, and a customer certificate.

6. The method as recited in claim 5, wherein populating the schema of the cloud node template with the accessed account data comprises populating said schema with one or more of: the subscription ID, the service account name, the storage account name, and the customer certificate.

7. The method as recited in claim 1, wherein submitting the formulated commands for deploying resources in the cloud in accordance with the common configuration of the cloud node template comprises submitting a deployment for a service in the cloud that is configured to assist one or more other services deployed in an on-premise cluster at the customer premise that is tasked with solving a common computing problem.

8. A computer program product comprising one or more physical memory devices having stored thereon computer-executable instructions that, when executed at a processor, cause the computer system to implement a method for configuring cloud resources at a computing component of a customer premise, and the method comprising:
    storing a cluster node template which includes a schema that is used by a customer at a computing component of a customer premise to encapsulate a common configuration for a of set nodes that represent resources provided at an on-premise cluster of nodes;
    storing a cloud node template which includes a schema that is used by the customer at the computing component of the customer premise to encapsulate a common configuration for a set nodes that represent cloud resources;

accessing account data established by the customer that permit the customer's use of cloud resources;

entering the customer's account data at a user interface of the computing component at the customer premise; one or more processors at the computing component retrieving the cloud node template and populating the schema of the cloud node template with the accessed account data;

entering a first set of commands at the user interface that result in establishing a common configuration for a set of nodes that represent particular resources to be employed at the on-premise cluster;

entering a second set of commands at the user interface that result in establishing a common configuration for a set of nodes that represent particular cloud resources to be employed at the cloud on behalf of the customer, and which supplement the resources otherwise provided by the set of nodes of the on-premise cluster;

one or more processors at the computing component populating the schema of the cluster node template with the common configuration for the set of nodes representing the particular resources of the on-premise cluster, and the one or more processors also populating the schema of the cloud node template with the common configuration for the set of nodes representing the particular cloud resources to be employed at the cloud on behalf of the customer;

instantiating at the computing component a cloud interface module which formulates commands for deploying resources in the cloud in accordance with the common configuration of the cloud node template for the account data contained in the cloud node template;

instantiating at the computing component an on-premise cluster manager which formulates commands for deploying resources in the on-premises cluster in accordance with the common configuration of the cluster node template;

the on-premise cluster manager submitting the formulated commands for deploying resources in the on-premise cluster in accordance with the common configuration of the cluster node template;

the cloud interface module submitting the formulated commands for deploying resources in the cloud in accordance with the common configuration of the cloud node template for the account data contained in the cloud node template to a cloud management service which thereafter employs cloud resources as specified in the common configuration on behalf of the account identified by the account data in the cloud node template; and storing both the populated cluster node template and the populated cloud node template so that each stored node template can be imported or exported for subsequent use in providing the common configuration contained therein to facilitate deployment of resources when desired by the customer.

9. The computer program product as recited in claim 8, wherein storing the populated cloud node template so that the stored cloud node template can be imported or exported for subsequent use comprises storing the populated could node template in a central location.

10. The computer program product as recited in claim 8, wherein computer-executable instructions that, when executed, cause the computer system to submit the formulated commands for deploying resources in the cloud in accordance with the common configuration of the cloud node template comprises submitting a deployment for a service in the cloud that is configured to assist one or more other services deployed in the on-premise cluster at the customer premise that is tasked with solving a common computing problem.

* * * * *